(12) United States Patent
Cheon

(10) Patent No.: US 7,547,994 B2
(45) Date of Patent: Jun. 16, 2009

(54) APPARATUS AND METHOD FOR MANAGING POWER OF MOBILE TERMINAL

(75) Inventor: Jee-Young Cheon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/014,042

(22) Filed: Jan. 14, 2008

(65) Prior Publication Data

US 2008/0169703 A1    Jul. 17, 2008

(30) Foreign Application Priority Data

Jan. 12, 2007    (KR) ...................... 10-2007-0003993

(51) Int. Cl.
- H02H 7/20 (2006.01)
- H01H 47/00 (2006.01)
- H02J 1/00 (2006.01)

(52) U.S. Cl. .................. 307/130; 307/82; 307/112; 307/116; 307/125; 307/139; 307/140; 307/150; 307/151

(58) Field of Classification Search ............. None
See application file for complete search history.

(56) References Cited

U.S. PATENT DOCUMENTS

| | | | | |
|---|---|---|---|---|
| 4,644,251 A | * | 2/1987 | Rathke | 323/267 |
| 5,387,820 A | * | 2/1995 | Imagawa | 307/31 |
| 5,623,398 A | * | 4/1997 | Beach et al. | 363/65 |
| 5,909,643 A | * | 6/1999 | Aihara | 455/127.3 |
| 5,994,795 A | * | 11/1999 | Gabillet | 307/66 |
| 6,340,944 B1 | * | 1/2002 | Chang et al. | 341/161 |
| 6,970,690 B2 | * | 11/2005 | Yajima et al. | 455/343.1 |
| 7,298,120 B2 | * | 11/2007 | Lam | 232/272 |
| 2007/0008663 A1 | * | 1/2007 | Nakashima et al. | 361/18 |

FOREIGN PATENT DOCUMENTS

JP    11-041825    * 7/1997

* cited by examiner

Primary Examiner—Albert W Paladini
Assistant Examiner—Adi Amrany
(74) Attorney, Agent, or Firm—Lee, Hong, Degerman, Kang & Waimey

(57) ABSTRACT

An apparatus for managing power of a mobile terminal includes: a first voltage regulating unit that changes the level of power from an external power source to a first level; a second voltage regulating unit that changes the level of power from the first voltage regulating unit or the external power source to a second level; and a switching unit that switches an output of the external power source or the first voltage regulating unit to the second voltage regulating unit. The coverage of an output voltage of the mobile terminal can be extended and the cost of the power management apparatus can be reduced.

9 Claims, 7 Drawing Sheets

US 7,547,994 B2

APPARATUS AND METHOD FOR MANAGING POWER OF MOBILE TERMINAL

CROSS-REFERENCE TO RELATED APPLICATION

Pursuant to 35 U.S.C. § 119(a), this non-provisional patent application claims the benefit of the earlier filing date and right of priority of Patent Application No. 10-2007-0003993 filed in Republic of Korea on Jan. 12, 2007, the entire contents of which are hereby incorporated by reference

BACKGROUND

An apparatus and method for managing power of a mobile terminal that automatically switches an input of a low dropout (LDO) regulating unit are provided.

As functions of mobile terminals are being diversified, the mobile terminals require DC voltages such as 1.2V, 1.4V, 1.8V, 2.5V, 2.5V, etc.

Thus, each power management system (PMS) of the mobile terminals includes a plurality of DCDC converters and a plurality of LDO regulators.

FIG. 4 is a block diagram showing a PMS of the related art mobile terminal.

With reference to FIG. 4, the related art PMS D100 is provided power from batteries (BATT). Accordingly, DCDC converters D111 and D112 output relatively a low voltage such as 1.8V or 1.4V, while the LDO regulators D121 to D127 output a relatively high voltage such as 2.6V to 3.0V.

The DCDC converters D111 and D112 are high-priced but have high efficiency of converting voltages, while the LDO regulators D121 to D127 are low-priced but have low efficiency of converting voltages if there is much difference between inputted or outputted voltages. Thus, if there is much difference between an input voltage and output voltage, the DCDC converters D111 and D112 are used, and if there is a little difference between the input voltage and the output voltage, the LDO regulators D121 to D127 are used.

Namely, if an output voltage is low when the same input voltage is dropped, the DCDC converters D111 and D112 are used, and if the output voltage is high when the same input voltage is dropped, the LDO regulators D121 to D127 are used.

However, because the related art PMS includes the relatively smaller number of DCDC converters D111 and D112 and the relatively larger number of LDO regulators D121 to D127, if a slightly lower voltage needs to be precisely outputted, the high-priced DCDC converters should be additionally installed.

SUMMARY

The present inventors recognized certain drawbacks of the related art, as explained above. Upon such recognition, the following concepts and features have been conceived.

An apparatus and a method for managing power of a mobile terminal in which an input of a low drop regulator is switched to thus substitutively perform a function of a DCDC converter is provided herein.

Thus, an apparatus for managing power of a mobile terminal includes: a first voltage regulating unit that changes the level of power from an external power source to a first level; a second voltage regulating unit that changes the level of power from the first voltage regulating unit or the external power source to a second level; and a switching unit that switches an output of the external power source or the first voltage regulating unit to the second voltage regulating unit, wherein the output level of the first voltage regulating unit and that of the second voltage regulating unit which has been applied from the first voltage regulating unit are within a certain range.

The first voltage regulating unit may include one or more first voltage regulators.

The switching unit may include one or more switches.

The second voltage regulating unit may include one or more low dropout (LDO) regulators.

The apparatus may further comprise a comparing unit that receives an output of the second voltage regulating unit and compares it with a pre-set reference voltage; and a controller that controls switching of the switching unit, and controls switching of the switching unit according to the comparison result from the comparing unit.

Also, a method for managing power of a mobile terminal includes: inputting an output of a first voltage regulating unit to a second voltage regulating unit; comparing an output of the second voltage regulating unit with a pre-set reference voltage; and automatically switching an input of the second voltage regulating unit according to the comparison result.

The inputting step may include switching to the output of the first voltage regulating unit, among the output of the first voltage regulating unit and an output of an external power source.

The comparing step may include monitoring the output of the second voltage regulating unit.

DETAILED DESCRIPTION

The exemplary embodiments of the present invention will now be described with reference to the accompanying drawings.

An exemplary mobile terminal will be described with reference to FIG. 1 from the perspective of its functions.

Figure 1:
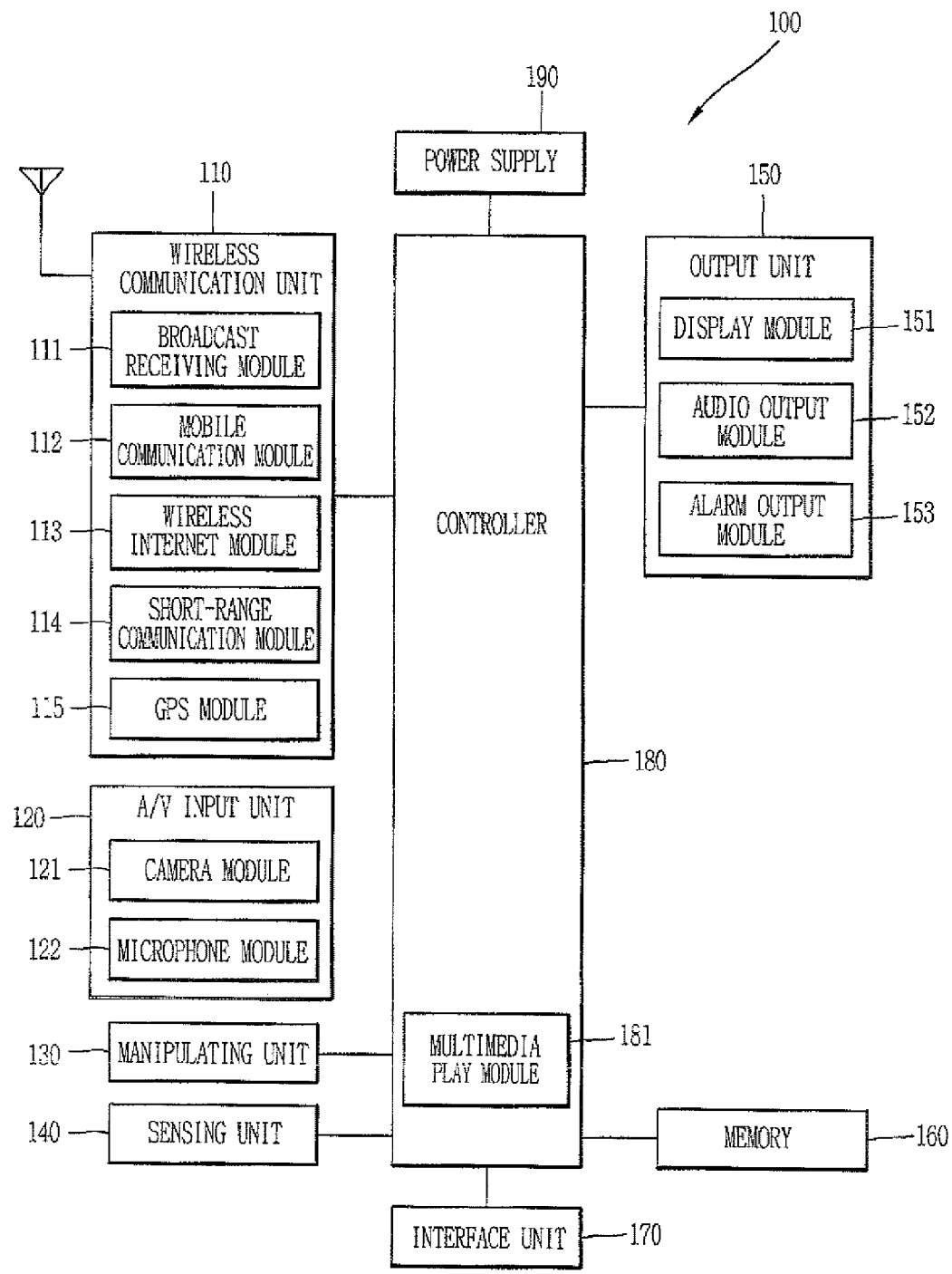
FIG. 1 is a block diagram of a mobile terminal according to an embodiment of the present invention.

FIG. 1 is a block diagram of a mobile terminal according to an embodiment of the present invention.

The mobile terminal 100 may comprise elements, such as a wireless communication unit 110, an audio/video (A/V) input unit 120, a manipulating unit 130, a sensing unit 140, an output unit 150, a storage unit 160, an interface unit 170, a controller 180, and a power supply unit 190, and the like. When these elements are actually implemented in the mobile terminal, if required, two or more elements may be combined together or one particular element may be divided into two or more elements.

The wireless communication unit 110 may comprise at least one of a broadcast receiving module 111, a mobile communication module 112, a wireless internet module 113, a short-range communication module 114 and a Global Positioning System (GPS) module 115.

The broadcast receiving module 111 receives a broadcast signal and/or broadcast associated information from an external broadcast management server via a broadcast channel. The broadcast channel may include a satellite channel and a terrestrial channel. The broadcast management server may refer to a server that generates and transmits a broadcast signal and/or broadcast associated information or a server that receives a pre-generated broadcast signal and/or broadcast associated information and sends them to the mobile terminal. The broadcast associated information may include information associated with a broadcast channel, a broadcast program, or a broadcast service provider, etc. The broadcast signal may include not only a TV broadcast signal, a radio broadcast signal, and a data broadcast signal, but also a broadcast signal obtained by combining the data broadcast signal to the TV broadcast signal or the radio broadcast signal.

The broadcast associated information may be provided via a mobile communication network, and in this case, it may be received by the mobile communication module 112.

The broadcast associated information may exist in various formats. For instance, the broadcast associated information may exist in such formats as Electronic Program Guide (EPG) of Digital Multimedia Broadcasting (DMB), Electronic Service Guide (ESG) of Digital Video Broadcast-Handheld (DVB-H), and the like.

The broadcast receiving module 111 receives broadcast signals by using various types of broadcast systems. In particular, the broadcast receiving module 111 may receive digital broadcast signals by using digital broadcast systems such as Digital Multimedia Broadcasting-terrestrial (DMB-T), Digital Multimedia Broadcasting-satellite (DMB-S), Media Forward Link Only (MediaFLO™), Digital Video Broadcast-handheld (DVB-H), Integrated Services Digital Broadcast-Terrestrial (ISDB-T), and the like. The broadcast receiving module 111 may be configured to be suitable for certain broadcast systems that provide broadcast signals, as well as for the digital broadcasting systems. Broadcast signals and/or broadcast associated information received via the broadcast receiving module 111 may be stored in the storage unit 160.

The mobile communication module 112 transmits/receives radio signals to/from at least one of a base station, an external mobile terminal, a server in a mobile communication network, and the like. Here, the radio signals may include a subscriber message (e.g., an SMS message, an FWIM, an FNIM status request message, a status response message, etc.), a voice call signal, a video call signal, or various formats of data according to transmission/reception of text/multimedia messages.

The wireless Internet (network) module 113 supports wireless network access. This module may be internally or externally coupled to the mobile terminal.

The short-range communication module 114 refers to a module for supporting short range communications. Some examples of short-range communication technology includes Bluetooth™, Radio Frequency IDentification (RFID), Infrared Data Association (IrDA), Ultra-WideBand (UWB), ZigBee™, and the like.

The Global Positioning System (GPS) module 115 may receive location information from a GPS network.

The A/V input unit 120 is configured to input an audio or video signal. The A/V input unit 120 may include a camera module 121 and a microphone module 122. The camera module 121 processes image data of still pictures or videos obtained by an image capture device in a video capturing mode or an image capturing mode. The processed image frames may be displayed on a display module 151.

The image frames processed by the camera module 121 may be stored in the storage unit 160 or transmitted via the wireless communication unit 110. Two or more camera modules 121 may be provided according to the configuration of the mobile terminal.

The microphone module 122 may receive sounds (audible data) via a microphone (or the like) in a phone call mode, a recording mode, a voice recognition mode, and the like, and process it into audio data. The processed audio (voice) data may be converted for output into a format transmittable to a mobile communication base station via the mobile communication module 112 in case of the phone call mode. The microphone module 122 may include various types of noise canceling (or suppression) algorithms to cancel (or suppress) noise generated in the course of receiving and transmitting audio signals.

The manipulating unit 130 may generate key input data inputted by a user to control various operations of the mobile terminal. The manipulating unit 130 may include a keypad, a dome switch, a touch pad (e.g., a touch sensitive member that detects changes in resistance, pressure, capacitance, etc.), a jog wheel, a jog switch, and the like. In particular, when the touch pad is overlaid on the display 151 in a layered manner, it may be called a touch screen.

The sensing unit 140 detects a current status (or state) of the mobile terminal 100 such as an open/close state of the mobile terminal 100, a location of the mobile terminal 100, presence or absence of user contact with the mobile terminal, etc., and generates commands or signals for controlling the operation of the mobile terminal 100. For example, when the mobile terminal 100 is a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 serves as an interface with at least one external device connected with the mobile terminal 100. For example, the external devices may include wired/wireless headsets, external power chargers, wired/wireless data ports, card sockets (e.g., for receiving a memory card, a Subscriber Identity Module/User Identity Module (SIM/UIM) card, etc.), audio input/output (I/O) ports, video I/O ports, earphones, microphones, and the like. The interface unit 170 may be used to receive inputs (e.g., data, information, power, etc.) from an external device and transfer the received inputs to one or more elements within the mobile terminal, or may be used to transfer data from the mobile terminal to an external device.

The output unit 150 is configured to provide outputs in a visual, audible, and/or tactile manner (e.g., audio signal, video signal, alarm signal, etc.). The output unit 150 may include the display module 151, an audio output module 152, an alarm output module 153, and the like.

The display module 151 may output information processed in the mobile terminal 100. For example, when the mobile terminal 100 is in the phone call mode, the display module 151 may display a User Interface (UI) or a Graphic User Interface (GUI) associated with a call or other communication. When the mobile terminal 100 is in the video call mode or the image capturing mode, the display module 151 may display a captured and/or received image, a UI, a GUI, and the like.

Meanwhile, when the display module 151 and the touch pad are overlaid in a layered manner to form a touch screen, the display module 151 may function as both an input device and an output device. The display module 151 may include at least one of a Liquid Crystal Display (LCD), a Thin Film Transistor-LCD (TFT-LCD), an Organic Light Emitting Diode (OLED), a flexible display, a three-dimensional (3D) display, or the like. The mobile terminal 100 may include two or more display modules (or other display means) according to its embodiment. For example, the mobile terminal may include an external display screen and an internal display screen.

The audio output module 152 may output audio data received from the wireless communication unit 110 or stored in the storage unit 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed by the mobile terminal 100. The audio output module 152 may include a speaker, a buzzer, a sound generating device, or the like.

The alarm output module 153 may provide outputs to inform about an occurrence of an event of the mobile terminal 100. Typical events may include a call signal reception, a message reception, a key signal input, etc. In addition to audio or video outputs, the alarm output module 153 may provide outputs in a different manner to inform about an occurrence of an event. For example, the alarm output module 153 may provide outputs in the form of vibrations (or other tactile means). When a call signal, a message, or some other incoming communication is received, the alarm output module 153 may provide tactile outputs (i.e., vibrations) to inform the user. Or when a key is pressed (or when a key signal is generated), the alarm output module 153 may output vibrations to provide tactile feedback with respect to the pressed key. By providing tactile outputs, the user can recognize the occurrence of various events. Outputs informing about the occurrence of an event may be also provided via the display module 151 or the audio output module 152. In other words, different types of outputs (audible, visual, tactile, etc.) may be set such that different types of events can be more easily recognized by the type of output being provided. For example, an incoming call may be indicated in an audible manner, an incoming text (or multimedia) message may be indicated in a visual manner, and keypad user inputs may be indicated in a tactile manner.

The storage unit 160 may store software programs or the like used for the processing and controlling performed by the controller 180, or may temporarily store inputted/outputted data (e.g., a phonebook, messages, still images, video, etc.).

The storage unit 160 may include at least one type of storage medium including a flash memory type, a hard disk type, a multimedia card type, a card-type memory (e.g., SD or DX memory, etc), a Random Access Memory (RAM), a Read-Only Memory (ROM), and the like. Also, the mobile terminal 100 may cooperate with a network storage device that performs the storage function of the storage unit 160 over a network connection.

The controller 180 typically controls the general operations of the mobile terminal. For example, the controller 180 performs controlling and processing associated with voice calls, data communications, video calls, and the like. The controller 180 can display instructions and operation data information or an authentication result received from the network 200 on the display module 151 for user reference or convenience.

The controller 180 delivers the instruction information to the wireless communication unit 110 to generate a subscriber message (e.g., an SMS message, an FWIM, an FNIM message status request message, a status response message, etc.) including the instruction information inputted by the user. And then, the controller 180 transmits the subscriber message to a destination via the wireless communication unit 110.

In addition, the controller 180 may include a multimedia reproducing (playback) module 181 for reproducing (or playing back) multimedia data. The multimedia reproducing module 181 may be configured as a hardware component within the controller 180 or may be configured as a software component separated from the controller 180 or a combination thereof.

The power supply unit 190 receives external or internal power and supplies power required for the operations of the respective elements under the control of the controller 180.

So far, the internal elements of the mobile terminal have been described from the perspective of their functions. Hereinafter, external elements of the mobile terminal will be described from the perspective of their functions with reference to FIGS. 2 and 3.

The mobile terminal may be implemented in a variety of different configurations, including a folder-type, a bar-type, a swing-type, a slide-type, or the like. For the sake of brevity, the slide-type mobile terminal will be used as an example in the following description. However, the concepts and features described herein should not be limited to the slide-type mobile terminal, but can be applicable to any type of mobile terminal or other electronic device including the ones as mentioned above.

Figure 2:
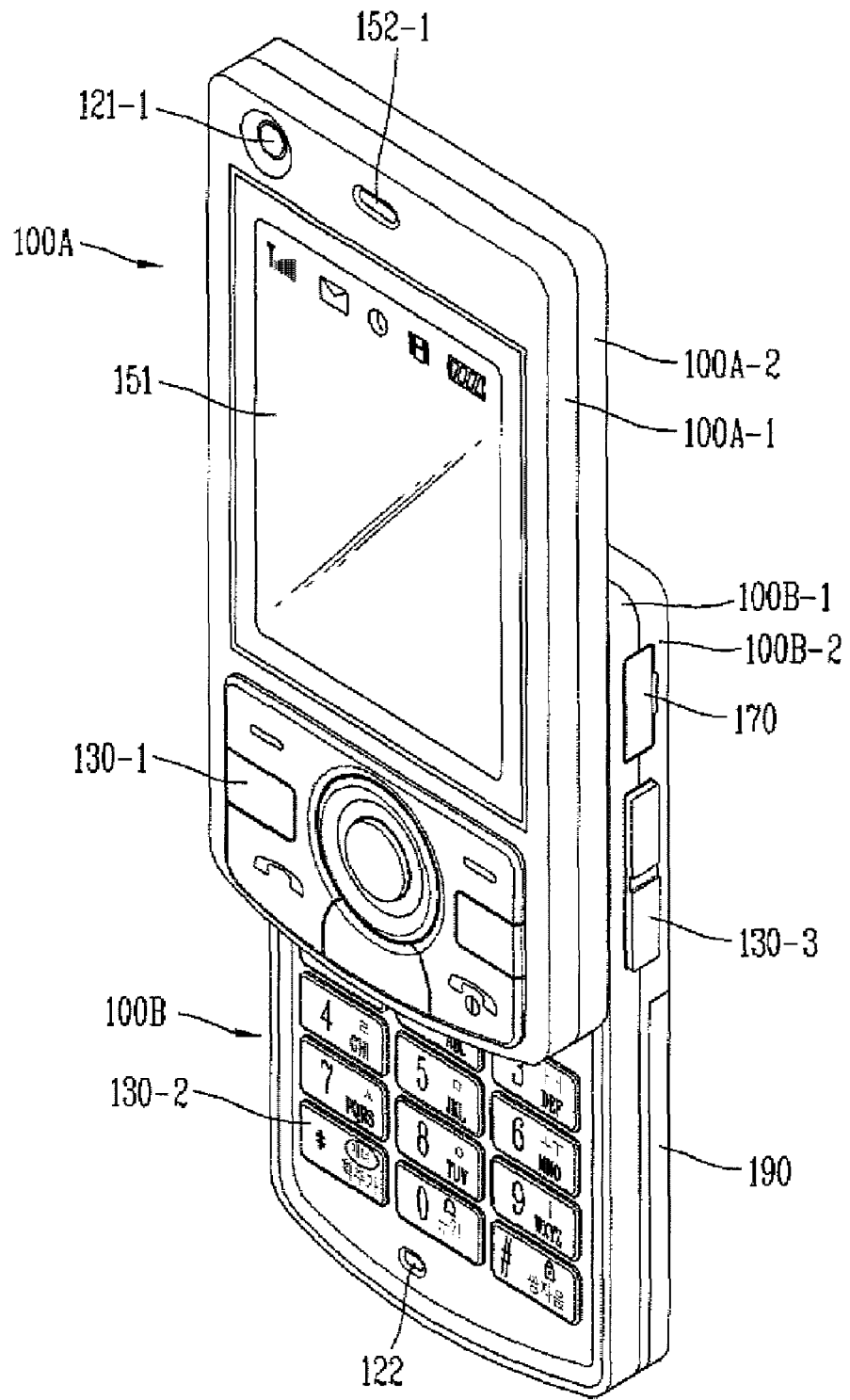
FIG. 2 is a front perspective view of the mobile terminal according to an embodiment of the present invention.

FIG. 2 is a front view of the mobile terminal according to an exemplary embodiment.

The mobile terminal may comprise a first body 100A, and a second body 100B configured to be slidably moved in at least one direction with respect to the first body 100A. In the closed position, the first body 100A is positioned over the second body 100B in a manner that (at least a portion of) the second body 100B is obscured (or blocked) by the first body 100A. In the open position, the first body 100A exposes at least part of the second body 100B.

A state in which the first body 100A is disposed to overlap with the second body 100B may be called a closed configuration, and as shown in FIG. 2, a state in which the first body 100A exposes at least a portion of the second body 100B may be called an open configuration.

The mobile terminal may usually operate in a standby mode in the closed configuration, but this mode can be released by the user. Also, the mobile terminal may mainly function in a call mode in the open configuration, but may be changed to the standby mode according to user manipulation or after the lapse of a certain time.

At least one case (housing, casing, cover, etc.) constituting the external appearance of the first body 100A comprises a first front case 100A-1 and a first rear case 100A-2. Various electronic components may be installed inside the first front case 100A-1 and the first rear case 100A-2. One or more intermediate cases may be additionally disposed between the first front case 100A-1 and the first rear case 100A-2.

The case can be formed by injection-molding a synthetic resin, or made of a metallic material such as stainless steel (STS) or titanium (Ti), or some other appropriate material.

The display module 151, a first audio output module 152-1, a first camera module 121-1 or a first manipulating unit 130-1 may be located on the first front case 100A-1 of the first body 10A.

The display module 151 may include LCD, OLED, and the like, that visually displays information.

A touch pad may be overlaid in a layered manner on the display module 151 to allow the display module 151 to function as a touch screen to input information.

The first audio output module 152-1 may be implemented as a receiver or a speaker.

The first camera module 121-1 may be implemented to be suitable for a user to capture still images or video of a user and so on.

Like the first body 100A, a case constituting the external appearance of the second body 100B may be formed by a second front case 10B-1 and a second rear case 100B-2.

A second manipulating unit 130-2 may be disposed at the second body 100B, specifically, on a front face of the second front case 100B-1.

A third manipulating unit 130-3, a microphone module 122 and an interface unit 170 may be disposed at either the second front case 100B-1 or the second rear case 100B-2.

The first to third manipulating units 130-1, 130-2 and 130-3 may be called a manipulating portion 130, and various methods can be employed for the manipulation portion so long as it can be operated by the user in a tactile manner. The manipulating portion 130 can be implemented as a dome switch or touch pad that can receive user commands or information according to a pressing, pushing or touching, or implemented in the form of a dial, a wheel, a jog element, a joystick, or the like to allow user manipulation thereof.

In terms of its functions, the first manipulating unit 130-1 is used for inputting commands such as start, end, scroll or the like, and the second manipulating unit 130-2 is used for inputting numbers, characters, symbols, or the like.

The third manipulating unit 130-3 can be operated to support a so-called hot key function (e.g., speed dialing, dedicated key inputs, etc.) for activating a special function of the mobile terminal.

The microphone module 122 may be implemented to be suitable for receiving the user's voice and other various sounds.

The interface unit 170 may be used as a link (passage or path) through which the terminal can exchange data or the like with an external device. For example, the interface unit 170 may be implemented as one of a connection port for connecting an earphone to the mobile terminal via a fixed or wireless means, a port for short-range communications (e.g., an Infrared Data Association (IrDA) port, a Bluetooth™ port, a wireless LAN port, etc.), power supply ports for providing power to the external device, or the like.

The interface unit 170 may be a card socket for accommodating an external card, such as a Subscriber Identity Module (SIM), a User Identity Module (UIM), a memory card for storing information, or the like.

The power supply unit 190 for supplying power to the terminal is located at the side portion of the second rear case 100B-2. The power supply unit 190 may be, for example, a rechargeable battery that can be detached.

Figure 3:
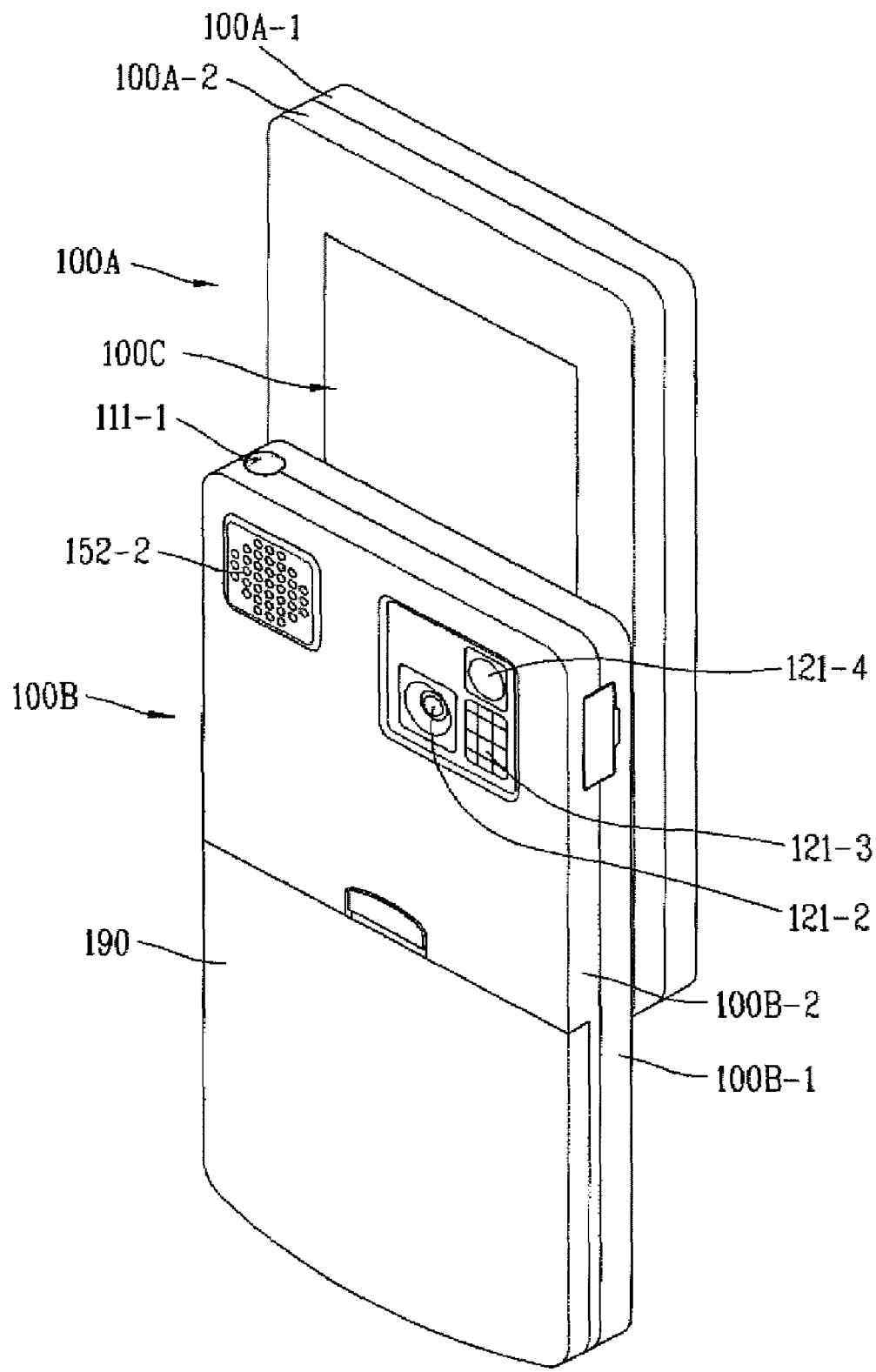
FIG. 3 is a rear view of the mobile terminal of FIG. 2.
Figure 4:
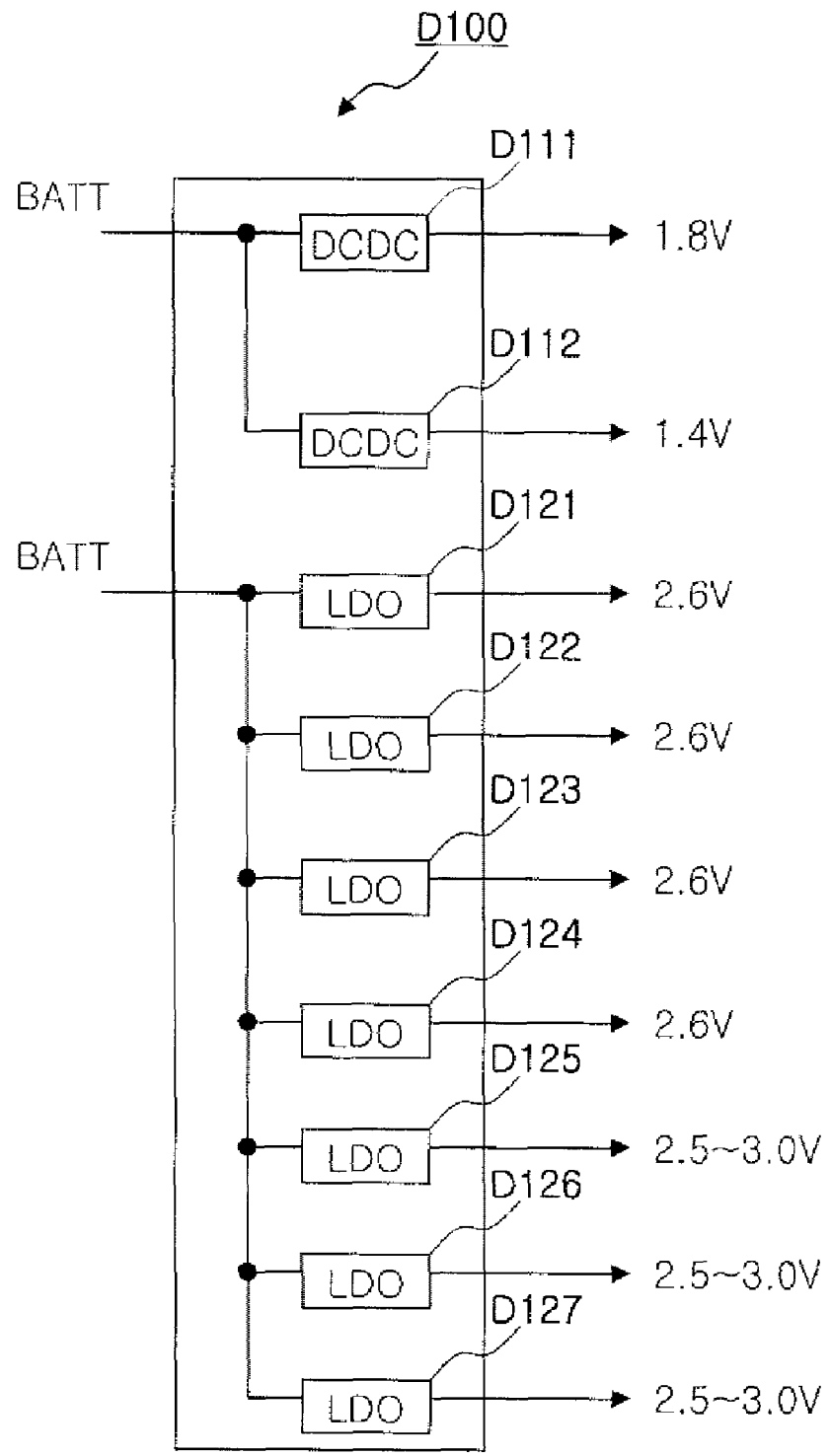
FIG. 4 is a schematic block diagram showing the configuration of an apparatus for managing power of a mobile terminal according to the related art.

FIG. 3 is a rear view of the mobile terminal according to an exemplary embodiment.

A second camera module 121-2 may additionally be disposed on a rear surface of the second rear case 100B-2 of the second body 100B. The second camera module 121-2 may have an image capture direction which is substantially the opposite to that of the first camera module 121-1, and may support a different number of pixels as that of the first camera module 121-1.

For example, the first camera module 121-1 may be used for low resolution (i.e., supporting a relatively small number of pixels) to quickly capture an image (or video) of the user's face and immediately transmit the same to the other party during video conferencing or the like. Meanwhile, the second camera module 121-2 may be used for high resolution (i.e., supporting a relatively large number of pixels) in order to capture more detailed (higher quality) images (or video) which typically do not need to be transmitted immediately.

A flash 121-3 and a mirror 121-4 may be additionally disposed adjacent to the second camera module 121-2. When an image of the subject is captured with the second camera module 121-2, the flash 121-3 illuminates the subject. The mirror 121-4 allows the user to see himself when he wants to capture his own image (self-image capturing) by using the second camera module 121-2.

The second rear case 100B-2 may further include a second audio output module 152-2. The second audio output module 152-2 may implement a stereophonic sound function in conjunction with the first audio output module 152-1, and may be also used for sending and receiving calls in a speaker phone mode.

A broadcast signal receiving antenna 111-1 may be disposed at one side or region of the second rear case 100B-2, in addition to an antenna that supports mobile communications. The antenna 111-1 can be configured to be retractable from the second body 100B-2.

One part of a slide module 100C that slidably combines the first body 100A and the second body 100B may be disposed on the first rear case 100A-2 of the first body 100A. The other part of the slide module 100C may be disposed on the second front case 100B-1 of the second body 100B, which may not be exposed as shown in FIG. 2.

In the above description, the second camera module 121-2 and so on is disposed on the second body 100B, but such configuration is not meant to be limited.

For example, one or more of the elements (e.g., 111-1, 121-2, 121-3, 152-2, etc.), which are disposed on the second rear case 100B-2 in the above description, may be mounted on the first body 100A, mainly, on the first rear case 100A-2. In this case, those elements disposed on the first rear case 100A-2 can be protected (or covered) by the second body 100B in the closed configuration. In addition, even if the second camera module 121-2 is not provided, the first camera module 121-1 may be configured to rotate (or otherwise be moved) to thus allow image capturing in various directions.

Figure 5:
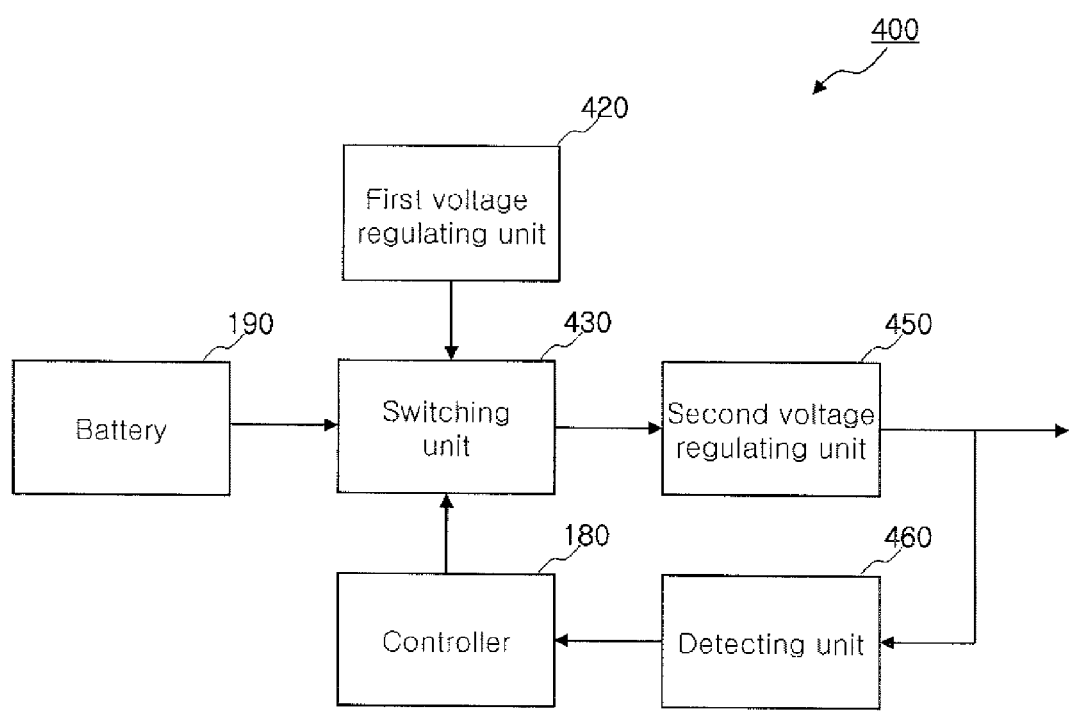
FIG. 5 is a schematic block diagram showing the configuration of an apparatus for managing power of a mobile terminal according to an embodiment of the present invention.

FIG. 5 is a schematic block diagram showing the configuration of an apparatus for managing power of a mobile terminal according to an embodiment of the present invention.

As shown in FIG. 5, a power management system (PMS) 400 may include a first voltage regulating unit 420 including a plurality of DCDC converters, a battery 190, a switching unit 430 that switches outputs of the first voltage regulating unit 420 and the battery 190, a second voltage regulating unit 450 including a plurality of LDO regulators that drops the voltage of the switched output; a detecting unit 460 that detects an output of the second voltage regulating unit 450 and compares it with a pre-set reference voltage; and a controller 180 that controls switching of the switching unit 430 according to the comparison result.

The apparatus for managing power of a mobile terminal constructed as described above operates as follows.

First, the switching unit 430 may switch the output of the battery 190 and that of the first voltage regulating unit 420 under the control of the controller 180.

Then, the second voltage regulating unit 450 may perform DCDC conversion on the switched output and drops and outputs the same, and the detecting unit 460 may compare the output value with the pre-set reference voltage value and transfer the comparison result value to the controller 180. Then, the controller 180 may control switching of the switching unit 430 according to the comparison result value.

For example, it is assumed that the switching unit 430 receives an output of 3.7V of the battery 190 and an output of 1.8V of the first voltage regulating unit 420. In this case, if the mobile terminal does not need a low voltage, the switching unit 430 may perform switching to input a 3.7V of battery voltage to the second voltage regulating unit 450. Then, the second voltage regulating unit 450 may output a stable DC voltage of 2.6V to 3V. If, however, the mobile terminal needs a low DC voltage of about 1.2V so it needs a DCDC converter, the switching unit 450 should switch the first voltage regulating unit 420 to input an output voltage of 1.8V to the second voltage regulating unit 450. Then, the second voltage regulating unit 450 would output the stable voltage of 1.2V.

Namely, if the second voltage regulating unit 450 receives the 3.7V of battery voltage, it should drop 2.5V to output 1.2V, but if the output voltage of 1.8V of the first voltage regulating unit 420 is inputted, 0.6V of voltage needs to be dropped, so the second voltage regulating unit 450 can output a stable low DC voltage, and as such, it can operate just like the DCDC converter in the PMS 400 of the mobile terminal.

If a voltage of about 1.4V is outputted due to an abnormal operation of the second voltage regulating unit 450, internal elements of the mobile terminal which are sensitive to power may malfunction.

Thus, the detecting unit 460 in which a voltage value with tolerance of about 0.2V to 0.4V compares the output voltage of the second voltage regulating unit 450 with a pre-set reference voltage value.

Preferably, the reference voltage value is an output voltage previously set in the second voltage regulating unit 450.

If the detecting unit 460 determines that the comparison result is an abnormal output which is higher or lower than the tolerance, the detecting unit 460 transmits a corresponding value to the controller 180, and accordingly, the controller 180 interrupts an input of the switching unit 430.

Namely, the controller 180 electrically opens the switching unit 430 to protect internal elements of the mobile terminal from an abnormal output.

In addition, the second voltage regulating unit 450 may receive a 3.7V of battery voltage and operate as an LDO regulator. Also, in this case, the detecting unit 460 and the controller 180 may operate in the same manner as described above.

Figure 6:
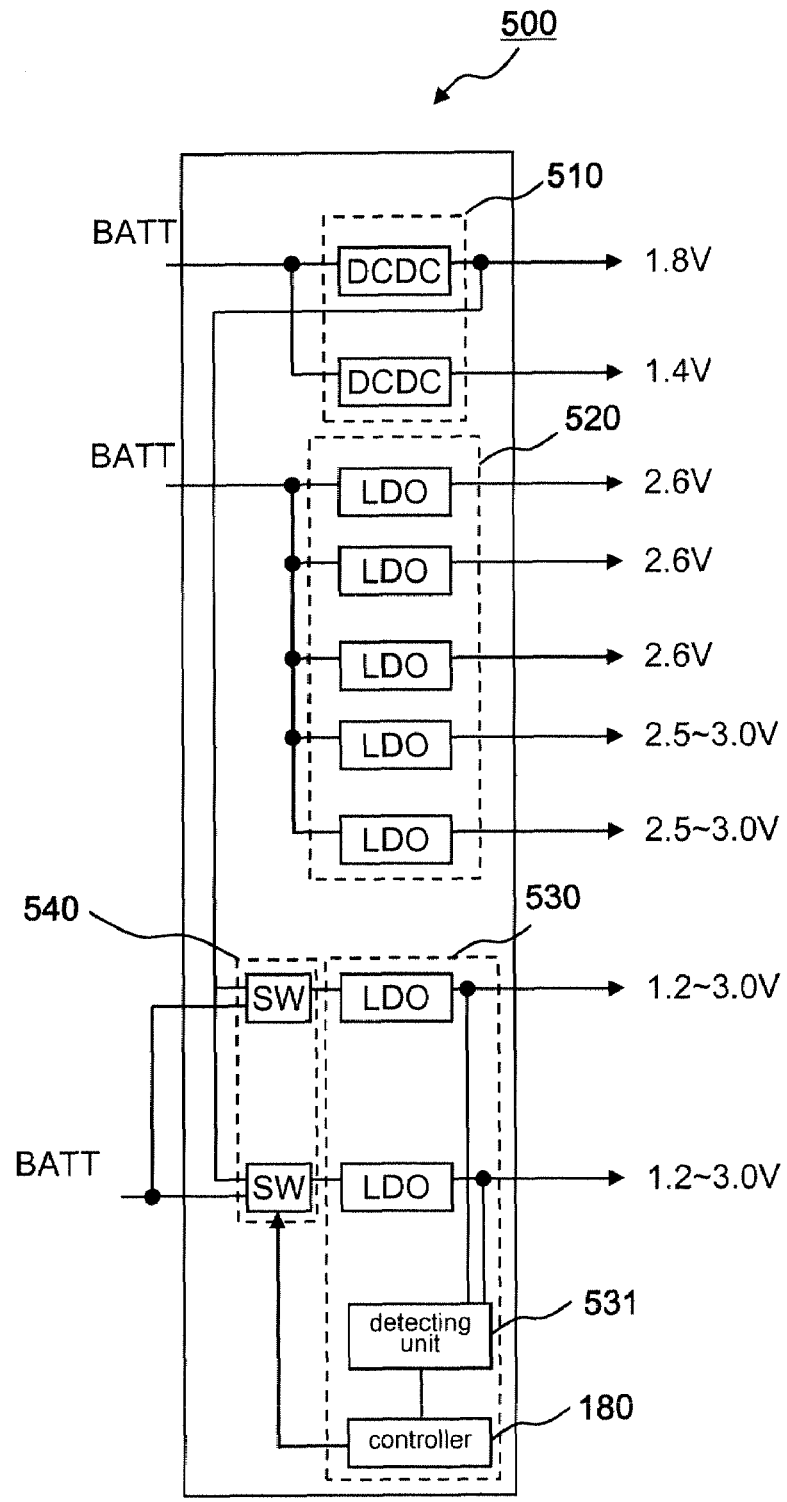
FIG. 6 is a block diagram showing the configuration of an apparatus for managing power of a mobile terminal according to an embodiment of the present invention.

FIG. 6 is a block diagram showing the configuration of an apparatus for managing power of a mobile terminal according to an embodiment of the present invention.

As shown in FIG. 6, the power management apparatus 500 may include a first voltage regulating unit 510 that receives a battery voltage, an external power source, drops the battery voltage, and outputs the dropped voltage; a voltage regulating unit 520 that receives the battery voltage, drops the received battery voltage, and outputs the dropped voltage, a switching unit 540 that switches an output of the battery voltage or the output of the first voltage regulating unit 510; and a second voltage regulating unit 530 that receives the output of the switching unit 540, drops the received output, and outputs the same.

The first voltage regulating unit 510 includes one or more DCDC converters, performs DCDC conversion on the battery voltage, precisely drops the converted voltage, and outputs the dropped voltage, and the voltage regulating unit 520 includes one or more LDO regulators, performs DCDC conversion on the battery voltage, drops the converted voltage, and outputs the dropped voltage.

The switching unit 540 receives the battery voltage and the output of the first voltage regulating unit 510, and switches them. The second voltage regulating unit 530 receives the switched voltage and outputs the same.

Here, the second voltage regulating unit 530 includes a detecting unit 531 that receives the output of the second voltage regulating unit 530 and compares it with a pre-set voltage, and a controller 180 that controls switching of the switching unit 540 according to the comparison result of the detecting unit 531.

The PMS of the mobile terminal according to the present invention constructed as described above operates as follows.

First, the switching unit 540 receives the output voltage of the first voltage regulating unit 510 and the output voltage of the battery and switches them to provide the output of the first voltage regulating unit 510.

Then, the second voltage regulating unit 530 receives the output of the first voltage regulating unit 510, drops it as a DC voltage of 1.2V to 3V, and outputs the same.

In this case, if the output of the second voltage regulating unit 530 is too low or too high, the internal elements of the mobile terminal which are sensitive to power may malfunction.

Thus, the detecting unit 531, in which a reference voltage value is set to have a tolerance of about 0.2V to 0.4V from a voltage value set in the second voltage regulating unit 530, compares the output voltage of the second regulating unit 530 with the pre-set reference voltage value and transmits the comparison value to the controller 180.

In this case, if the controller 180 determines that the comparison value is an overvoltage, the controller immediately stops the operation of the switching unit 540.

Namely, the controller 180 electrically opens the switching unit 540 to thus protect the internal elements of the mobile terminal from the over-voltage. In addition, if the comparison value is a low voltage, the controller controls the switching unit 540 in the same manner.

Here, when the switching unit 540 switches to the battery output, the second voltage regulating unit 530 operates in the same manner as the voltage regulating unit 520.

Meanwhile, the second voltage regulating unit 530 may receive the battery output and operate in the same manner as the voltage regulating unit 520.

Figure 7:
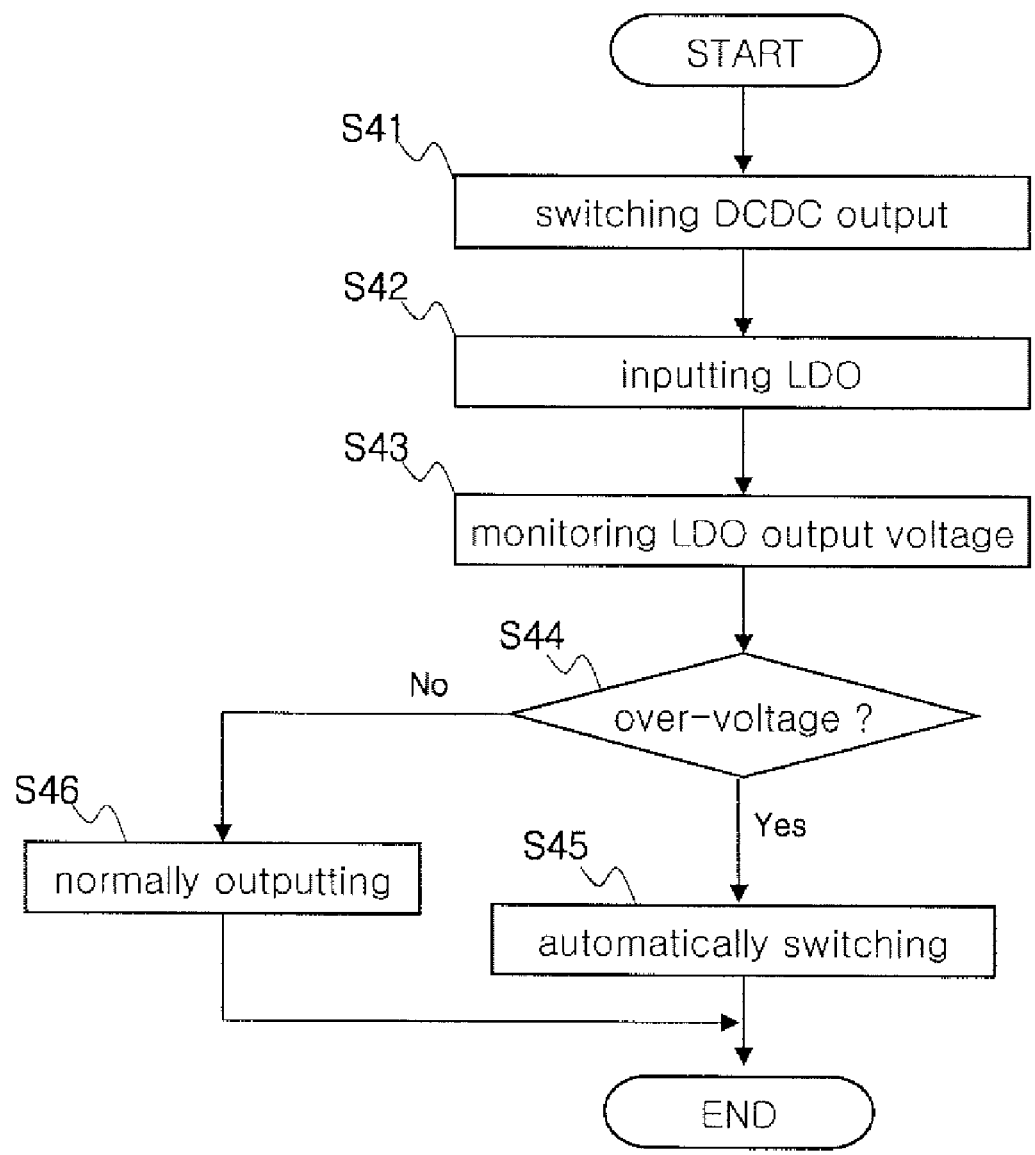
FIG. 7 is a flow chart illustrating the process of a method for managing power of a mobile terminal according to an embodiment of the present invention.

FIG. 7 is a flow chart illustrating the process of a method for managing power a mobile terminal according to an embodiment of the present invention.

The power management method of the mobile terminal will now be described with reference to FIG. 7.

First, when the mobile terminal needs a low-voltage output of the DCDC converter, the controller 180 controls switching of the switching unit 540 such that an output of the first voltage regulating unit 510 can be inputted to the second voltage regulating unit 530 (S41).

Preferably, the low voltage is lower than 2V.

Then, the second voltage regulating unit 530 receives the switched output, drops its voltage, and outputs the same (S42).

Meanwhile, the detecting unit 531, in which the reference voltage value is set to have the tolerance of about 0.2V to 0.4V from the voltage value set to be outputted by the second voltage regulating unit 530, detects the output voltage of the second voltage regulating unit 530 and compares it with the pre-set reference voltage value (S43).

If the controller 180 determines the comparison value is greater than or smaller than the pre-set tolerance (S44), the controller 180 immediately stops the operation of the switching unit 540 (S44).

Namely, the controller 180 electrically opens the switching unit 540 to protect the internal elements of the mobile terminal from the over-voltage (excessive voltage) and the low voltage.

If the controller 180 determines that the comparison value is not an abnormal voltage, the controller 180 maintains the current state (S46).

As so far described, the apparatus and method for managing power of the mobile terminal according to the present invention has the following advantages.

That is, because the DCDC converted in the power management apparatus can be replaced with the low-priced LDO regulator, the coverage of the output voltage of the power management apparatus can be extended and the cost of the power management apparatus can be reduced.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. An apparatus for managing power of a mobile terminal, comprising:
    a first voltage regulating unit that changes the level of power from an external power source to a first level;
    a second voltage regulating unit that changes the level of power from the first voltage regulating unit or the external power source to a second level;
    a comparing unit that compares an output of the second voltage regulating unit to a pre-set reference voltage;
    a switching unit that switches an output of the external power source or the first voltage regulating unit to the second voltage regulating unit; and
    a controller that controls the switching of the switching unit according to the comparison result from the comparing unit,
    wherein the output level of the first voltage regulating unit and the output level of the second voltage regulating unit are within a certain range,
    wherein the controller controls the switching unit to immediately switch to disconnect the output of the first voltage regulating unit from the second voltage regulating unit and to connect the output of the external power source to the second voltage regulating unit when the output of the second voltage regulating unit is greater than a voltage equal to the pre-set reference voltage plus a pre-set tolerance value or less than a voltage equal to the pre-set reference voltage minus the pre-set tolerance value.

2. The apparatus of claim 1, wherein the first voltage regulating unit comprises one or more first voltage regulators.

3. The apparatus of claim 1, wherein the switching unit comprises one or more switches.

4. The apparatus of claim 1, wherein the second voltage regulating unit comprises one or more low dropout (LDO) regulators.

5. The apparatus of claim 1, wherein the pre-set tolerance value is between approximately 0.2 V and approximately 0.4 V.

6. A method for managing power of a mobile terminals the method comprising:
    inputting a regulated power source output of a first voltage regulating unit to a second voltage regulating unit;
    comparing an output of the second voltage regulating unit to a pre-set reference voltage; and
    automatically and immediately switching an input of the second voltage regulating unit when the output of the second voltage regulating unit is greater than a voltage equal to the pre-set reference voltage plus a pre-set tolerance value or less than a voltage equal to the pre-set reference voltage minus the pre-set tolerance value.

7. The method of claim 6, wherein switching the input of the second voltage regulating unit comprises switching from inputting the output of the first voltage regulating unit to inputting an output of an external power source.

8. The method of claim 6, wherein comparing the output of the second voltage regulating unit further comprises monitoring the output of the second voltage regulating unit.

9. The method of claim 6, wherein the pre-set tolerance value is between approximately 0.2 V and approximately 0.4 V.

* * * * *